United States Patent [19]

Stringfield et al.

[11] Patent Number: 5,683,800

[45] Date of Patent: Nov. 4, 1997

[54] SURFACE-MODIFIED POST-CROSSLINKED ADSORBENTS AND A PROCESS FOR MAKING THE SURFACE MODIFIED POST-CROSSLINKED ADSORBENTS

[75] Inventors: Richard T. Stringfield; Mladen Ladika, both of Midland, Mich.

[73] Assignee: The Dow Chemical Company, Midland, Mich.

[21] Appl. No.: 590,742

[22] Filed: Jan. 24, 1996

Related U.S. Application Data

[63] Continuation-in-part of Ser. No. 331,073, Oct. 28, 1994, Pat. No. 5,519,064.

[51] Int. Cl.[6] .................................. B32B 9/00; B32B 3/26
[52] U.S. Cl. ............... 428/318.04; 210/635; 428/318.6; 521/31; 521/38; 521/54; 521/146; 521/149
[58] Field of Search ............................. 428/318.4, 318.6; 521/31, 38, 54

[56] References Cited

U.S. PATENT DOCUMENTS

| | | | |
|---|---|---|---|
| 4,043,979 | 8/1977 | Cram | 260/47 |
| 4,511,475 | 4/1985 | Yuki et al. | 210/635 |
| 4,694,044 | 9/1987 | Kiniwa | 525/178 |
| 4,950,332 | 8/1990 | Stringfield et al. | 127/55 |
| 4,965,083 | 10/1990 | Norman et al. | 426/422 |
| 5,021,253 | 6/1991 | Dawson-Ekeland et al. | 426/422 |
| 5,079,274 | 1/1992 | Schneider et al. | 521/146 |
| 5,416,124 | 5/1995 | Stringfield | 521/146 |

FOREIGN PATENT DOCUMENTS

| | | |
|---|---|---|
| 0249274 | 9/1987 | Germany. |
| 62-232609 | 10/1987 | Japan. |
| 2-136802 | 5/1990 | Japan. |

OTHER PUBLICATIONS

D. Klempner and K.C. Frisch, Ed., Advances in Interpenetrating Polymer Networks, vol. II, Technomic Publishing Co., Inc., Lancaster, Basel, (1990), pp. 157–176.

C.H. Sperling, Interpenetrating Polymer Networks and Related Materials, (1981), pp. 3–5.

*Primary Examiner*—Morton Foelak

[57] ABSTRACT

Disclosed is a surface-modified polymeric adsorbent material comprising a porous post-crosslinked polymer as a substrate and at least one surface-modifying polymer. The porous post-crosslinked polymer comprises a polymer of at least one monoethylenically unsaturated monomer, wherein the polymer has been post-crosslinked in a swollen state in the presence of a Friedel-Crafts catalyst. A process for preparing the surface-modified polymeric adsorbent materials, and the use of these materials in the separation of organic compounds, enantioselective synthesis and resolution of racemic mixtures are also disclosed.

5 Claims, 6 Drawing Sheets

SURFACE-MODIFIED POST-CROSSLINKED ADSORBENTS AND A PROCESS FOR MAKING THE SURFACE MODIFIED POST-CROSSLINKED ADSORBENTS

CROSS REFERENCE TO RELATED APPLICATION

This application is a continuation-in-part of Application Ser. No. 08/331,073, filed Oct. 28, 1994, now U.S. Pat. No. 5,519,064.

BACKGROUND OF THE INVENTION

This invention concerns a polymeric adsorbent material comprising a post-crosslinked polymer as a substrate which has been surface-modified with at least one polymer and to a process for preparing such polymeric adsorbent materials. The polymeric adsorbents have controlled pore geometry and variable chemical functionality. The polymeric adsorbents may have an interpenetrating polymer network.

The rapid advances in bio-technology along with consumers' desire for tastier, healthier, and more esthetically pleasing food and beverage products have created urgent needs for highly selective, efficient, and cost-effective processes for separating various chemicals from complex mixtures. Environmental concerns for cleaner air, water and soil have further increased a demand for better and improved separation systems. Thus, the demand for better separation materials is rapidly moving beyond the realm of the conventional adsorbents and membranes.

Interpenetrating polymer networks (IPN) using polystyrene/polystyrene as models for ion-exchange resin matrices (IER-IPN) were first introduced in the sixties (see for example, J. R. Millar, *Journal of Chemical Society*, p. 1311 (1960); p. 1789 (1962); and p. 218 (1963)). More recently, IER-IPNs have been described in "Sulfonic Acid Resins With Interpenetrating Polymer Networks", in D, Klempner and K. C. Frisch, Ed., *Advances in Interpenetrating Polymer Networks*, Volume II, Technomic Publishing Co., Inc., Lancaster, Basel, (1990), pp. 157–176.

One of the drawbacks in IPN technology has been the necessity of the first crosslinked polymer to adsorb, imbibe, or swell in the monomer or second polymer to create molecular interpenetration. Until now, molecular interpenetration was thought to occur only in the cases where two or more polymer phases within the IPN possessed similar solubility characteristics or solubility parameters. In the case of crosslinked polymer substrates, the substrate polymer is either insoluble or swells in the presence of a compatible monomer or polymer possessing similar solubility parameters. Depending on the free energy of mixing, the crosslinked polymer either phase separates or fails to imbibe the monomer or second polymer (see for example, C. H. Sperling, *Interpenetrating Polymer Networks and Related Materials*, Plenum Press, New York, (1981)).

Another drawback to conventional IPNs prepared from conventional highly crosslinked adsorbents is the loss in porosity as the pores of the first polymer are filled with the monomer or second polymer. The final pore distribution in these IPNs is determined by the amount of the second polymer and the mixing thermodynamics governed by the Flory Huggins theory.

Polymeric adsorbents and ion exchange resins of macronet type polymers (post-crosslinked) are described in U.S. Pat. Nos. 4,263,407 and 4,191,813. These patents teach that the macronet adsorbents obtained from macroreticular (macroporous) copolymers may be used as substrates for hybrid copolymers and ion exchange resins. In a method for preparing the hybrid copolymers and ion exchange resins, a liquid monomer mixture containing a crosslinking monomer is added to an aqueous suspension of the macronet adsorbent, which liquid mixture is imbibed into the pores of macronet adsorbent and is polymerized therein. The resulting hybrid product may then be converted into an ion exchange resin by appropriate functionalization in the conventional manner.

It is an object of this invention to provide surface-modified adsorbent materials which have useful surface area, desired porosity, surface functionality and physical properties for a variety of chromatographic separations.

SUMMARY OF THE INVENTION

It has been discovered that the use of porous post-crosslinked polymer as a substrate makes the micropores of the polymer gel interior surface (pores with less than 20 Angstroms (2 nm) in diameter) accessible to a large variety of molecules due to the large amount of microporosity created by the displacement of the polymer chains in the swollen state during post-crosslinking, and makes it possible to obtain surface-modified polymeric adsorbents with minimum loss of useful surface area and larger pores (larger than micropores) of the substrate polymer. The use of porous post-crosslinked polymer as the substrate also makes it possible to sufficiently entangle, crosslink, or graft different polymers thereon and prevent leaching of the polymers, without the necessity of the two polymers having similar solubility characteristics or solubility parameters. It has been further found that when a surface-modifying monomer having similar solubility characteristics as the polymer substrate is incorporated into the substrate, the loss in porosity is less than what would be expected from simple pore filling of the substrate.

"Post-crosslinked polymer" means alkylene bridged polymer produced by crosslinking in a swollen state, in the presence of a Friedel-Crafts catalyst, lightly crosslinked gel or macroporous polymers of at least one monoethylenically unsaturated monomer.

In one aspect, the present invention concerns a polymeric adsorbent material comprising a porous post-crosslinked polymer as a substrate and at least one surface-modifying polymer, the porous post-crosslinked polymer comprising a polymer of at least one monoethylenically unsaturated monomer, wherein the polymer has been post-crosslinked in a swollen state in the presence of a Friedel-Crafts catalyst.

In another aspect, the present invention concerns a process for preparing a polymeric adsorbent material comprising incorporating at least one surface-modifying polymerizable monomer or polymer onto a porous post-crosslinked polymer substrate, and immobilizing the surface-modifying monomer or polymer thereto, the porous post-crosslinked polymer comprising a polymer of at least one monoethylenically unsaturated monomer, wherein the polymer has been post-crosslinked in a swollen state in the presence of a Friedel-Crafts catalyst.

In still another aspect, the present invention concerns a method for separation of organic molecules comprising contacting a mixture of organic compounds with a surface-modified polymeric adsorbent, wherein the surface-modified polymeric adsorbent comprises a porous post-crosslinked polymer substrate and at least one surface-modifying polymer, the porous post-crosslinked polymer comprising a polymer of at least one monoethylenically unsaturated monomer, wherein the polymer has been post-crosslinked in a swollen state in the presence of a Friedel-Crafts catalyst.

In yet still another aspect, the present invention concerns a method for enantioselective synthesis of an organic compound from a synthetic precursor comprising contacting the synthetic precursor with a surface-modified polymeric adsorbent, and reacting the synthetic precursor with a reactant, wherein the surface-modified polymeric adsorbent comprises a porous post-crosslinked polymer substrate and at least one optically active surface-modifying polymer, the porous post-crosslinked polymer comprising a polymer of at least one monoethylenically unsaturated monomer, wherein the polymer has been post-crosslinked in a swollen state in the presence of a Friedel-Crafts catalyst.

In still another aspect, the present invention concerns a method for resolution of a racemic mixture comprising contacting the racemic mixture with a surface-modified polymeric adsorbent and separating an enantiomer thereof, wherein the surface-modified polymeric adsorbent comprises a porous post-crosslinked polymer substrate and at least one optically active surface-modifying polymer, the porous post-crosslinked polymer comprising a polymer of at least one monoethylenically unsaturated monomer, wherein the polymer has been post-crosslinked in a swollen state in the presence of a Friedel-Crafts catalyst.

The polymeric adsorbent materials can be prepared from post-crosslinked copolymers of different shapes and forms such as beads, membranes, fibers and the like. The polymeric adsorbent materials of the invention are useful for separation of solutes from solutions, as chromatographic packing materials in chromatographic separation systems, as catalysts in chemical processing, as ion exchange resins when appropriately functionalized, in separation of proteins, in resolution of racemic mixtures, as asymmetric templates in enantioselective transformation and the like.

BRIEF DESCRIPTION OF THE DRAWINGS

FIG. 1 illustrates a Transmission Electron Micrograph of porous post-crosslinked polymer comprising a macroporous polymer of 6 percent divinylbenzene and 94 percent styrene, which has been post-crosslinked in the presence of a Fridel-Crafts catalyst and further aminated with dimethylamine.

FIG. 2 illustrates a Transmission Electron Micrograph of the polymeric adsorbent of the invention comprising the porous post-crosslinked polymer of FIG. 1 as a substrate and 7 percent Nylon as the surface-modifying polymer.

FIG. 3 illustrates a Transmission Electron Micrograph of the polymeric adsorbent corresponding to FIG. 2 except with 20 percent Nylon as the surface-modifying polymer.

FIG. 4 illustrates a Transmission Electron Micrograph of the polymeric adsorbent of the invention comprising the porous post-crosslinked polymer of FIG. 1 as substrate and a surface-modifying polymer comprising moieties derived from 25 percent of an epoxy resin crosslinked with an amine.

FIG. 5 illustrates a Transmission Electron Micrograph of a porous post-crosslinked polymer comprising a macroporous polymer of 6 percent divinylbenzene and 94 percent styrene, which has been post-crosslinked in the presence of a Fridel-Crafts catalyst and further aminated with methylamine.

FIG. 6 illustrates a Transmission Electron Micrograph of the interpenetrating polymer adsorbent of the invention comprising the porous post-crosslinked polymer of FIG. 5 as the substrate polymer and a surface-modifying polymer comprising moieties derived from 10 percent silicone epoxy grafted to the aminated substrate polymer.

DETAILED DESCRIPTION OF THE INVENTION

Substrate Polymer

Figure 1:
FIGS. 1 through 6 illustrate Transmission Electron Micrographs (300,000X) of 300 Angstrom thick cross-sections of respective polymers as described below.

One of the polymers of the adsorbent of the invention is a substrate polymer. The substrate polymer is a porous post-crosslinked polymer comprising at least one monoethylenically unsaturated monomer wherein the polymer has been post-crosslinked in a swollen state in the presence of a Friedel-Crafts catalyst.

The term "polymer", as used herein in reference to the substrate polymer, refers to homopolymers of monoethylenically unsaturated monomers and copolymers of at least one monoethylenically unsaturated monomer and a polyunsaturated crosslinking monomer.

The porous post-crosslinked polymers are preferably produced from lightly crosslinked gel or macroporous polymers that possess good swelling characteristics and are described in U.S. Pat. Nos. 4,965,083; 4,950,332; and 4,263,407.

The "macroporous polymer" is broadly defined to include polymers prepared by polymerization of monomers in the presence of an amount of an inert organic diluent sufficient to cause phase separation of the resulting polymer from unreacted monomer and the diluent.

The "gel type polymer" is broadly defined to include polymers which may be prepared by polymerization of the respective monomers in the presence of an amount of an inert organic diluent without phase separation of the resulting polymer from unreacted monomer and the diluent.

The macroporous polymers are prepared by the methods described in German Patent No. 249,274 A1 and U.S. Pat. Nos. 4,965,083 and 4,950,332.

The gel polymers are prepared by the methods described in U.S. Pat. No. 5,079,274.

Monoethylenically unsaturated monomers include both aliphatic and aromatic monomers. Monoethylenically unsaturated aliphatic monomers preferably include monovinyl aliphatic monomers, for example derivatives of acrylic and methacrylic acids and acrylonitrile. The preferred monovinyl aliphatic monomers include methyl methacrylate, acrylonitrile, ethyl acrylate, 2-hyroxyethyl methacrylate and mixtures thereof.

Monoethylenically unsaturated aromatic monomer preferably is a monovinylidene aromatic monomer. Monovinylidene aromatic monomers include, for example, styrene and its derivatives, such as ortho-, meta- and para-methyl styrenes, and ortho-, meta-, and para-ethyl styrenes; vinylnaphthalene; vinylbenzyl chloride and vinylbenzyl alcohol. Preferred monovinylidene aromatic monomers include styrene, vinylbenzylchloride, methylstyrene and ethylstyrene. The most preferred monovinylidene aromatic monomer is styrene.

The polymers are preferably derived from (1) polyunsaturated monomer which acts as a crosslinking agent and (2) a monoethylenically unsaturated monomer. At least one of the polyunsaturated and monoethylenically unsaturated monomers is aromatic, preferably both are aromatic provided that at least major portion (at least 50 percent by weight based on the total weight of monomers used) is aromatic.

Polyunsaturated crosslinking monomers include, for example, the polyvinylidene compounds listed in U.S. Pat.

No. 4,382,124. Preferred polyunsaturated crosslinking monomers are divinylbenzene (including commercially available divinylbenzene containing less than about 45 weight percent ethylvinylbenzene), trivinylbenzene, and ethylene glycol diacrylate, mixtures thereof and the like. Other suitable aliphatic polyunsaturated monomers can include divinylsulfide and such similar compounds. While hydrocarbon monomers are preferred, the crosslinking monomers may also include heterocyclic compounds such as divinylpyridine. The most preferred crosslinking monomer is divinylbenzene.

For crosslinking, sufficient amounts of the polyunsaturated monomer may advantageously be used to give dimensional stability to the polymers so that they will swell rather than dissolve in the subsequent swelling steps. The amount of crosslinking required will depend on the polymer's porosity characteristics desired. The percent crosslinking in the polymer prior to post-crosslinking of the polymer is based on that weight percent of the polymers which is attributable to the polyunsaturated monomer. The crosslinking monomer serves to increase the physical stability of the adsorbent. The amount of crosslinking monomer required depends significantly on the process conditions used to prepare the polymer and can range anywhere from about 0.1 to about 35 percent by weight of total monomer. When the crosslinking monomer is an aliphatic polyunsaturated monomer, the amount used is less than 20 percent by weight of the total monomer. In the instances where the polymer comprises both a monoethylenically unsaturated aliphatic monomer and an aliphatic polyunsaturated monomer, the amount of the two monomers does not exceed more than 20 percent by total weight of all the monomers.

Macroporous polymers generally may be prepared by forming a suspension of a monomer mixture within an agitated, continuous suspending medium. The monomer mixture comprises at least one monoethylenically unsaturated monomer, preferably a crosslinking monomer, an effective amount of inert diluent, and an effective amount of a free-radical polymerization initiator.

The inert diluent preferably acts as a solvent for the monomer but not for the product polymer. The desired diluent will be determined by the character of the monomers in the monomer mixture and the type of porosity characteristics desired.

The inert diluents may be separated into two types depending upon the type of swelling effect the diluent has on the polymer. Non-swelling inert diluents exert essentially no solvent action on the polymer. Such non-swelling diluents include alkanols with a carbon atom content of from about 4 to about 10, and higher saturated aliphatic hydrocarbons, such as heptane, and isooctane.

The second type of inert diluent includes those which exert a swelling action on the copolymers. Such diluents are typically employed in the preparation of isoporous copolymer beads. Examples of such diluents include solvents such as ethylene dichloride, toluene, benzene, xylene and methylene chloride. Preferably, toluene is used as the swelling inert diluent. As a further guide in the selection of a suitable diluent, reference may be made to scientific literature, for example, Hildebrand and Scott, *Solubility of Non-Electrolytes*, 3rd ed., N. Y. (1950).

The term suspension polymerization is a term well known to those skilled in the art and comprises suspending droplets of the monomer or monomer mixture and of the inert diluent in a medium in which neither are soluble. This may be accomplished by adding the monomer or monomer mixture and the inert diluent with any additives to the suspending medium which contains a dispersing or suspending agent. For the ethylenically unsaturated aromatic monomers of the present invention, the suspending medium is usually water, the suspending agent, and a suspension stabilizer, e.g., gelatin, polyvinyl alcohol or a cellulosic such as hydroxyethyl cellulose, methyl cellulose or carboxymethyl methyl cellulose. When the medium is agitated, the organic phase (monomer and porogenic solvent) disperses into fine droplets. Polymerization is initiated by heating the suspension to a temperature of typically from about 50° C. to about 90° C. in the presence of a free radical initiator. The suspension is maintained at the polymerization temperature until a desired degree of conversion of monomer to copolymer is obtained. Suitable methods of suspension polymerization are illustrated in U.S. Pat. Nos. 4,419,242; 4,564,644; and 4,444,961.

The free-radical initiator may be any one or a combination of conventional initiators for generating free radicals in the polymerization of ethylenically unsaturated monomers. Representative initiators are UV radiation and chemical initiators such as azobisisobutyronitrile, benzoyl peroxide, t-butylperoctoate, t-butylperbenzoate and isopropylpercarbonate. Other suitable initiators are mentioned in U.S. Pat. Nos. 4,192,921; 4,246,386; and 4,283,499. The free-radical initiators are employed in an amount sufficient to induce polymerization of the monomers in a particular monomer mixture. An effective amount will vary, as those skilled in the art can appreciate, and will depend generally on the type of initiators employed, as well as the type and proportion of monomers being polymerized. Generally, an effective amount is from about 0.005 to about 10 percent, and preferably from about 0.025 to about 2 weight percent, based on total monomer weight.

The preferred macroporous polymer is prepared from about 1 to about 35 percent by weight of divinylbenzene, with the balance being (the weight percent of) styrene. More preferably, the macroporous polymer is prepared from about 1 to about 15 percent by weight of divinylbenzene and most preferably from about 1 to about 10 percent by weight of divinylbenzene, based on the total monomer weight.

The gel polymer is prepared by suspension polymerization by methods known in the art and comprises from about 0.0 to about 20.0 percent by weight of divinylbenzene, with the balance being the weight percent of styrene. Preferably, the gel polymer is a polymer of about 0.1 to about 8.0 percent by weight of divinylbenzene with the balance being styrene.

The macroporous or gel polymer is post-crosslinked in a swollen state in the presence of a Friedel-Crafts catalyst to introduce rigid microporosity (pores with a diameter less than about 20 Å) into the copolymer. Post-crosslinking of the polymer while it is in a swollen state displaces and rearranges adjacent polymer chains, thereby causing an increase in the number of micropores. This rearrangement serves to increase overall porosity and surface area of the copolymer, while also decreasing the average pore size. Post-crosslinking also serves to impart rigidity to the polymer structure, which is useful for providing enhanced physical and dimensional stability to the polymer.

Post-crosslinking may be achieved by haloalkylating or acylating the polymer by reacting the polymer with a polyfunctional alkylating or acylating agent, swelling the resulting haloalkylated polymer with an inert swelling agent, and thereafter maintaining the swollen, haloalkylated polymer at a temperature and in the presence of a Friedel-Crafts catalyst such that haloalkyl or acyl moieties on the polymer react with an aromatic ring of an adjacent polymer chain to form a bridging moiety. Friedel-Crafts catalysts are Lewis acids and include, for example, $AlCl_3$, $FeCl_3$, $BF_3$ and $HF$. $AlCl_3$ and $FeCl_3$ are preferred. In the instances where the polymer is, for example, a polymer of styrene, vinylbenzyl chloride and divinylbenzene, the haloalkylation or acylation of the polymer is not necessary. In those instances, the polymer is swollen with an inert swelling agent and post-crosslinked in the swollen condition to obtain the bridging moieties. The post-crosslinking methods are described in U.S. Pat. Nos. 4,191,813 and 4,263,407.

The terms microporosity, mesoporosity and macroporosity refer to the pore volume per gram of sample for each type of pore respectively, and are determined by the nitrogen adsorption method in which dried and degassed samples are analyzed on an automatic volumetric sorption analyzer. The instrument works on the principle of measuring the volume of gaseous nitrogen adsorbed by a sample at a given nitrogen partial pressure. The volumes of gas adsorbed at various pressures are used in the B.E.T. model for the calculation of the surface area of the sample. The average pore diameter is calculated from the relationship between the surface area and the pore volume of the sample, assuming a cylindrical pore geometry. Micropores are pores with a diameter less than about 20 Å (2 nm), mesopores are pores with a diameter from 20 Å to 200 Å (2 nm to 20 nm), and macropores are pores with a diameter greater than 200 Å (20 nm).

The pore size range or the porosity range of the porous post-crosslinked polymers as a substrate for the adsorbent material of the invention can be selectively chosen depending upon the intended application of the surface-modified adsorbent of the invention obtained therefrom, and the composition of the surface-modifying monomer or polymer.

In applications where adsorption capacity is a primary consideration and the molecules to be separated are small (<800 MW) and diffusional limitations are a consideration, the post-crosslinked polymer containing 0.2 to 1.0 cc/g of micropores is preferred, with 0.4 to 0.7 cc/g of micropores being the most preferred. The balance of the pore volume can be mesopores and macropores up to a total pore volume of 2.0 cc/g.

In applications where the adsorption rate is a primary consideration and the molecules to be separated are greater than 200 MW, the post-crosslinked polymer containing 0.2 to 0.4 cc/g of micropores, with the balance of the pore volume being contributed by mesopores and macropores up to a total pore volume of 2.0 c/g, is preferred.

In applications where adsorption capacity is a primary consideration and the molecules to be separated are small (<800 MW) and diffusional limitations are not a consideration, the post-crosslinked polymer containing porosity of about 0.2 to 1.0 cc/g contributed by the micropores is preferred, with 0.4 to 1.0 cc/g of the porosity contributed by the micropores being the most preferred. The balance of the pore volume can be mesopores and macropores up to a total pore volume of 2.0 cc/g.

A porous post-crosslinked polymer substrate for the adsorbents of the invention is described in commonly assigned pending U.S. patent application Ser. No. 262,820, filed Jun. 21, 1994. The porous post-crosslinked polymer described therein is prepared from a macroporous polymer of from 45 to 80 weight percent of at least one aromatic monomer, from 0 to about 20 weight percent of a monovinyl aliphatic monomer and from 20 to 35 weight percent of a polyvinyl aromatic crosslinking monomer. In any given instance, the ratio of the monovinyl aromatic and aliphatic monomer to the polyvinyl aromatic crosslinking monomer is from 1.8 to 4.0. Typically, the inert solvent used in the preparation of this macroporous polymer comprises from 50 to 70 weight percent and preferably from 55 to 65 weight percent of the total weight of the monomer mixture and the inert solvent. The total porosity of the porous post-crosslinked polymer obtained therefrom is at least 1.5 cc/g, with the microporosity ranging from about 0.2 to about 0.4 cc/g, and comprising less than 20 percent of the total porosity. At the same time, the mesoporosity exceeds 0.5 cc/g with the preferred range being between from 0.5 to 1.3 cc/g.

Surface-modified Substrate Polymer

The surface-modified adsorbents of the invention can generally be prepared by a two-step process. The first step involves selective incorporation of a polymerizable monomer or a polymer into the micropores of the porous post-crosslinked polymer substrate and the second step involves the immobilization of the polymerizable surface-modifying monomer or the polymer onto the post-crosslinked polymer substrate.

The term "incorporation" as used herein refers to imbibing or adsorbing the surface-modifying polymer or monomer onto the porous post-crosslinked substrate polymer. It also refers to precipitating out the surface-modifying polymer or monomer from its solution onto the porous post-crosslinked substrate polymer.

The incorporation of the surface-modifying monomer or polymer onto the porous post-crosslinked polymer can be accomplished by various methods. In one method, a solution of a polymerizable monomer or a polymer may be adsorbed onto the post-crosslinked substrate by continuous addition of the solution onto the porous post-crosslinked substrate polymer.

The efficiency of the adsorption can be optimized by a proper choice of the solvent for the surface-modifying monomer or the polymer. Water, any organic solvent, or a mixture of water and one or more organic solvents can be used to dissolve the surface-modifying monomer or the polymer. Illustrative of the organic solvents include hexane, isooctane, dodecane and aliphatic ethers. As a further guide in the selection of a suitable solvent, reference may be made to scientific literature, for example, Hildebrand and Scott, *Solubility of Non-Electrolytes*, 3rd ed., N. Y. (1950).

A primary consideration in choosing the solvent is that there is a significant driving force for the adsorption of the surface-modifying monomer or the polymer onto the surface of the substrate polymer. The driving force for this adsorption can be a difference in hydrophilicity of the post-crosslinked polymer substrate and the solvent. See, for example, A. Ben-Naim, *Hydrophobic Interactions*, Plenum Press, New York (1980).

The concentration of the surface-modifying monomer or the polymer in solution varies depending on its solubility, the molecular weights of the surface-modifying monomer or the polymer, the pore distribution and the pore volume of the post-crosslinked polymer substrate. The concentration of the surface-modifying monomer or the polymer in the aqueous or organic solvent ranges from about 1 ppm to about 50 weight percent by weight of the solution. The surface-modifying monomer or the polymer can be gradually added to the post-crosslinked substrate at a rate which is slower than the rate of the adsorption of the surface-modifying monomer or the polymer thereto.

In another method, the surface-modifying polymerizable monomer or the polymer can also be adsorbed from the vapor phase and condensed onto the post-crosslinked polymer.

Still another method of incorporating a surface-modifying monomer or a polymer involves precipitation of the surface-modifying monomer or the polymer from its solution onto the porous crosslinked polymer substrate, for example, by changing the solvent polarity or pH by methods known to one skilled in the art.

The second step in the preparation of the surface-modified post-crosslinked adsorbents of the invention involves immobilization of either the surface-modifying monomer or the polymer onto the substrate polymer.

The immobilization of the surface-modifying monomer or the polymer can be accomplished by polymerizing and crosslinking the surface-modifying monomer or the polymer in situ with the functional groups present in the post-crosslinked polymer substrate. The immobilization may also be achieved by grafting the surface-modifying monomer or the polymer to the substrate polymer using the functional groups present both in the substrate polymer and surface-modifying polymers and monomers. An example of a functional group on the substrate polymer that can be used in grafting is a residual chloromethyl functionality, which readily reacts with a broad variety of functional groups in the surface-modifying monomer or polymer. The polymerization, crosslinking and grafting of the polymerizable surface-modifying monomer or the polymer onto the substrate polymer is achieved by methods known in the art.

An important aspect of the invention is that, depending on the intended application, polymeric adsorbents of the invention can be prepared without substantially altering the porosity, water retention capacity, and pore structure of the substrate polymer by properly choosing the synthesis conditions of the substrate polymer and surface-modifying polymers.

Although it is not intended to limit the invention to any theory, it is believed that the substrate polymer is in a relaxed state because of being post-crosslinked in the swollen state, i.e., it is pre-swollen or dissolved in a thermodynamically good solvent before the bridging reaction occurs. After the post-crosslinking, the alkylene bridges are formed between the polymer chains. These rigid bridges weaken the interaction between polymer chains by hindering the chains from approaching each other upon removal of the solvent. A considerable fraction of the polymer chains in post-crosslinked polymers are available for solvation by a wide variety of molecules. This phenomenon gives the post-crosslinked polymer an affinity for a wide variety of molecules because the open "pre-swollen" network is available for interaction with a variety of molecules and does not require a large enthalpic contribution in order to swell the post-crosslinked polymer substrate. Consequently, materials that usually do not possess similar solubility character or solubility parameter as the styrenic polymers adsorb readily onto the porous post-crosslinked polymer. It is believed that this phenomenon eliminates the need for the substrate polymer and the surface-modifying monomer or polymer to have similar solubility characteristics or solubility parameters in order to achieve molecular interpenetration.

The process of the invention for preparing the adsorbent materials from the porous post-crosslinked polymer substrate offers versatility in producing an almost unlimited variety of chemical modifications to the post-crosslinked polymer's internal surface and pores. The choice of surface-modifying polymerizable monomer or polymer and the method for the immobilization thereof onto the post-crosslinked polymer substrate depend on the desired application of the resulting polymeric adsorbents. Any given polymerizable monomer or a polymer may be used to obtain the surface-modified post-crosslinked polymeric adsorbents of the invention. The surface-modifying polymers may be either optically active or non-optically active.

In the process of the invention, during the continuous addition of the polymerizable surface-modifying monomer or the polymer onto the substrate polymer, smaller micropore domains of the substrate polymer are filled first. These smaller micropores, after filling, become inaccessible and are not useful in later separation or synthesis processes. By selectively filling the micropore domains and immobilizing the initial surface, modifying the monomer or polymer therein, it is possible to immobilize subsequent surface-modifying monomers or polymers into the remaining larger pores of the substrate polymer.

The subsequent surface modification of the adsorbent polymers of the invention is accomplished by using reactive sites incorporated into the substrate polymer via the initial surface-modifying monomer or polymer. Thus, various chemical reactive compounds can be selectively located into the various pore domains of the substrate polymer.

The actual amount of the surface-modifying monomer or polymer in the adsorbent will vary depending on the physicochemical properties of the surface-modifying polymer, the pore distribution of the substrate polymer and the degree of crosslinking and post-crosslinking in the substrate polymer. Typically, the maximum amount of the surface-modifying monomer or polymer is the amount necessary to fill pores less than 100 Å and produce a monolayer or a thin film of the polymer on the macropores of the resulting adsorbent. The minimum amount of the surface-modifying monomer or polymer is the amount necessary to provide sufficient functionality for the desired application.

The weight ratio of the surface-modifying polymerizable monomer(s) or polymer(s) to the porous post-crosslinked polymer substrate can effectively range from about 0.01:1 to about 1.5:1. Preferably, the ratio varies from about 0.05:1 to about 0.8:1.

The polymeric adsorbent materials of the invention are useful for separation of solutes from solutions, as chromatographic packing materials in chromatographic separation systems, as catalysts for chemical processing, as ion exchange resins when appropriately functionalized, for separation of proteins, for resolution of racemic mixtures, as asymmetric templates in enantioselective transformation and the like.

The adsorbent materials of the invention may be particularly useful in the separation of compounds via chromatography. For these applications, the adsorbents may be prepared from either optically active or non-optically active, surface modifying polymers. Non-optically active polymers do not rotate the plane of polarized light. Typical surface modifying polymers of the non-optically active type include polymers prepared from acrylates, methacrylates, and/or styrenics. Included are polymers prepared from such compounds as butyl acrylate, methyl methacrylate, allyl methacrylate, methacrylic acid, styrene, and functionalized styrenes such as vinylbenzylchloride.

The above non-optically active, surface modifying polymers are copolymerized by routine procedures well-known in the art. These procedures are described below in relation to optically active polymers. Subsequent incorporation and immobilization of the non-optically active polymers are also accomplished in a similar manner to that of optically active polymers described below.

The adsorbent materials of the invention are also particularly useful in the resolution of racemic mixtures and as asymmetric templates in enantioselective synthesis. For these applications, the adsorbents typically comprise an optically-active polymer as surface-modifying polymers.

Optically active polymers contain asymmetric centers in the main chain and/or side chains; see for example, A. Abe and K. Inomata, "Optically Active Polymers", in *Polymer Handbook*, 3rd Ed., Wiley Interscience, pp VII 561-Vii/575 (1980). Any hydrophobic, hydrophilic (ionic), or amphiphilic optically active polymer can be immobilized onto the surface of the post-crosslinked polymer substrate. Alternatively, an optically active monomer or a mixture of an optically active monomer with other optically active monomer or optically inactive monomer can be adsorbed onto the surface of the substrate polymer and immobilized by polymerizing, crosslinking or grafting as described above.

An example of optically-active polymers useful in the present invention are described in U.S. Pat. No. 5,435,919.

The optically active polymers described in the above-mentioned applications are amphiphilic, water-soluble copolymers comprising a hydrophobic component having a chiral moiety and a hydrophilic component having an ionic group. Preferably, the optically active polymer further comprises an achiral hydrophobic component. The hydrophilic component may be a monomer which already contains the ionic species or which contains a precursor functionality which can be readily converted into ionic species. Examples of precursor groups which can be readily converted into cationic species are reactive halides which can react with neutral nucleophiles to produce cationic groups. Preferred cationic precursor functionalities are pendant benzyl halides which are capable of reacting, for example, with ammonia or dimethyl sulfide to produce the unsubstituted ammonium or dimethyl sulfonium cations, respectively, e.g.,

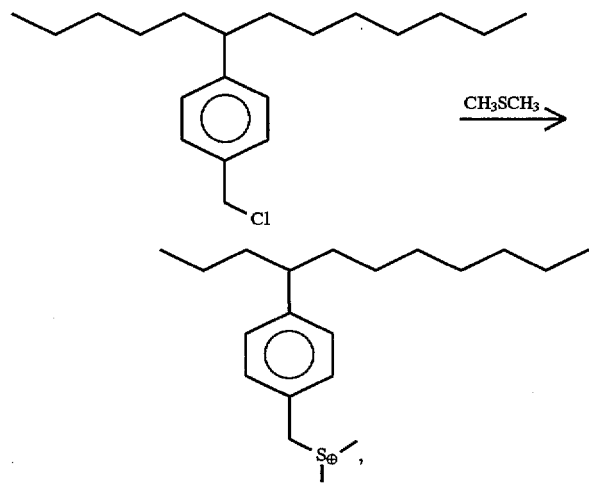

or are amines or sulfides which are capable of reacting with alkyl halide to produce a substituted ammonium or sulfonium cation, e.g.,

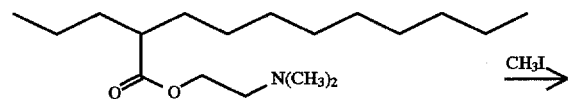

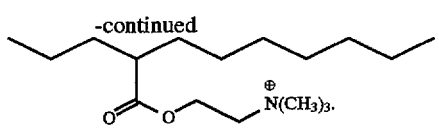

Examples of preferred anionic precursor functionalities are the carboxylic acids and sulfonic acids which are readily ionized under alkaline conditions to the preferred carboxylate and sulfonate anions.

The hydrophilic component containing either the ionic group or a synthetic precursor to the ionic group is preferentially incorporated into the polymer by copolymerization with unsaturated monomers containing the desired functionality. The preferred unsaturated monomers are of the styrenic, acrylic or methacrylic type. The acrylic and methacrylic type monomers are inclusive of the corresponding acids, esters and amides. Suitable styrenic monomers include, for example, styrene sulfonic acid sodium salt, vinylbenzoic acid and vinylbenzyl-chloride (VBC). Suitable acrylic or methacrylic monomers include, for example, methacrylic acid, 2-acrylamido-2-methyl-l-propanesulfonic acid (AMPS), 2-acrylamidoglycolic acid, and 2-(dimethylamino)ethyl methacrylate.

Alternatively, a portion of the aromatic rings in unsubstituted polystyrene may be directly functionalized, e.g., by sulfonation or by chloromethylation followed by amination.

The hydrophilic monomeric component generally comprises from 25 to 80 weight percent of the total monomer employed to produce the desired polymeric surfactant, preferably from 30 to 60 weight percent.

The optically active polymeric materials preferably contain a hydrophobic component which carries the chiral functionality. The hydrophobic component is preferentially incorporated into the polymer by copolymerization with an ethylene-type monomer, preferably an optically-active ethylene-type monomer. Suitable optically-active ethylene-type monomers include the following: chiral alkenes, such as β-pinene and limonene; substituted chiral alkenes, such as 1-penten-3-ol; chiral vinyl ethers and esters, such as vinyl sec-butyl ether and vinyl 2-alkoxy- or 2-aryloxypropionates; and chiral esters and amides of acrylic, methacrylic and vinylacetic acids, such as menthyl methacrylate, bornyl acrylate, cholesteryl vinylacetate and N-(1-phenylethyl) methacrylamide. The preferred chiral monomers are the optically-active esters and amides of acrylic and methacrylic acids.

These optically-active unsaturated monomers can be produced by routine methods well known to those of ordinary skill in the art. For example, the preferred optically-active esters and amides of acrylic and methacrylic acids can be prepared by the reaction of the appropriate unsaturated acid chloride with an optically-active alcohol or amine. Preferred chiral alcohols include terpene-derived alcohols like menthol, borneol and α-terpineol; steroid-derived alcohols like cholesterol; and secondary alcohols like α-methyl benzyl alcohol. Preferred chiral amines include primary amines of secondary alkyl groups like a-methyl benzyl amine, 2-amino-l-alkanols derived from α-aminoacids like alaninol, and primary amines derived from terpenes like bornylamine.

The hydrophobic monomeric component generally comprises from 3 to 70 weight percent of the total monomer employed to produce the desired polymeric surfactant, preferably from 10 to 50 weight percent.

The optically active polymers may also include an achiral, hydrophobic component. Optionally, the achiral, hydrophobic component can contain polymerizable groups which allow a limited amount of crosslinking. Too much crosslinking may adversely affect the water solubility of the resulting polymeric surfactant. The achiral hydrophobic component is preferentially incorporated into the optically active polymer by copolymerization with achiral unsaturated monomers. Suitable achiral unsaturated monomers include the following: alkenes, such as propylene and butadiene; styrene and substituted styrenes, such as t-butyl-styrene, α-methylstyrene and divinylbenzene; ester and amide derivatives of acrylic and methacrylic acids, such as ethyl acrylate, acrylamide, methyl methacrylate, lauryl methacrylate, allyl methacrylate and 2-hydroxyethyl methacrylate; vinyl ethers and esters, such as alkyl vinyl ethers and vinyl alkanoates; and vinyl nitriles, such as acrylonitrile.

The hydrophobic achiral monomeric component generally comprises from 0 to 62 weight percent of the total monomer employed to produce the desired polymeric surfactant, preferably from 15 to 55 weight percent. Any vinyl-addition crosslinkable component, e.g., allyl methacrylate, is limited to 10 weight percent or less of the monomer employed to produce the desired polymeric surfactant, preferably less than 3 weight percent.

The copolymerizations of the above-described monomers are typically achieved by routine procedures well known to those skilled in the art. For example, for terminally unsaturated monomers which are the preferred starting materials for the optically active polymers, copolymerization is accomplished by free radical polymerization of the vinyl groups of the monomers. Thus, for example, the monomeric components are contacted together under an inert atmosphere with a free radical initiator in the presence of an inert organic solvent under conditions which afford polymerization, typically elevated temperatures and a nitrogen atmosphere. If a monomer which serves as a precursor to the ionic functionality was originally employed in the polymerization, the resulting reaction mixture is further contacted with the appropriate reagent under conditions which convert the precursor into the ionic functionality. The desired polymers are isolated by conventional procedures. Often it is most convenient to isolate the product as an aqueous solution.

The optically active polymers described above are immobilized on the porous post-crosslinked polymer substrate by the methods described above to obtain optically active adsorbents of the present invention. The optically active polymer can be nonpolar, polar, cationic, anionic, or zwitterionic, depending on the choice of monomers. Preferred cationic groups are substituted sulfonium -S$^+$R$_2$ groups and substituted ammonium -N$^+$R$_3$ groups. R is preferably methyl. Preferred anionic groups are carboxylate and sulfonate groups.

The optically active surface-modified polymeric adsorbents are useful for resolution of racemic mixtures and as asymmetric templates in enantioselective transformations. While it cannot always be easily predicted which enantiomer of the racemic mixture will preferentially interact with the optically active polymer in a particular resolution process, the result can be easily determined by routine experimentation. Both the configurations of the optically-active copolymer are equivalent in their resolving power so that replacement of one configuration with the other results in the preferential interaction with the other enantiomer of the racemic mixture.

In a typical experiment, a solution of the racemic mixture to be resolved is added to the optically active polymeric adsorbent of the invention. The resulting mixture is stirred or shaken in order to increase the rate of complexation, and the liquid phase is easily separated by decantation or filtration. Effective resolution of the racemic mixture can be achieved by multistage operation if no significant enantiomeric enrichment per unit operation occurs.

The following examples serve to illustrate the invention. Surface area, pore size, and porosity were determined on a Quantachrome Model Autosorb-1 nitrogen adsorption analyzer by measuring the volume of gaseous nitrogen adsorbed by a sample at a given nitrogen partial pressure and by conducting the appropriate calculations according to the B.E.T. model.

EXAMPLE 1

A post-crosslinked polymer was prepared from a gel copolymer of 1.5 weight percent divinylbenzene and 98.5 weight percent styrene by a procedure described in U.S. Pat. No. 5,079,274.

EXAMPLES 1a–1e

The polymeric adsorbents of the invention were prepared by adding 100 grams (g) (45 g dry) of wet post-crosslinked polymer produced from Example 1 to each of 5 pint bottles.

The beads were slurried by adding 125 ml of deionized water. Ethylene glycol dimethacrylate (EGDM) containing 0.20 weight percent t-butylperoctoate initiator was added to the 5 pint bottles in the amounts of 1.0, 2.0, 4.0, 8.0 and 16.0 grams, respectively. The containers were capped and placed on a shaker bath and heated to 70° C. for 21 hours. After polymerization each sample was rinsed with 10 bed volumes of methanol and 10 bed volumes of water to remove any residual monomers. Similarly, the beads were extracted with methylene chloride to remove residual monomers.

EXAMPLE 2

A porous post-crosslinked polymer was produced from a macroporous copolymer prepared from 6.0 percent by weight of divinylbenzene and 94 weight percent of styrene according to a procedure described in German Pat. No. DD 249,274 A1. The post-crosslinked polymer is then functionalized by aminating the chloromethyl groups with dimethylamine.

FIG. 1 illustrates the transmission electron micrograph of the polymer.

EXAMPLE 2a

The polymeric adsorbent beads were prepared by adding 4.34 g of polyamide (melting temperature of the polymer TM=95° C.) and 60 ml of m-cresol to a 3-neck 1 liter round-bottom flask equipped with stirrer, reflux condenser and heating mantle. The mixture was heated to 100° C. to dissolve the polyamide. Next 300 milliliter (mL) of deionized water were added to the flask and the mixture cooled to 60° C. While agitating vigorously, 134 g of wet (58.2 g dry) aminated post-crosslinked polymer of Example 2 were added to the flask. The vessel was heated at 97° C. for 20 hours. The adsorbent polymer was transferred to a fritted column and the m-cresol was extracted from the beads with 1500 mL of 2-propanol.

EXAMPLES 3a and 3b

The polymeric adsorbent beads were prepared essentially by the procedure described in Example 2a except 4.34 g and 11.32 g, respectively, of Nylon 6 were substituted for the polyamide.

Figure 2:
Figure 3:
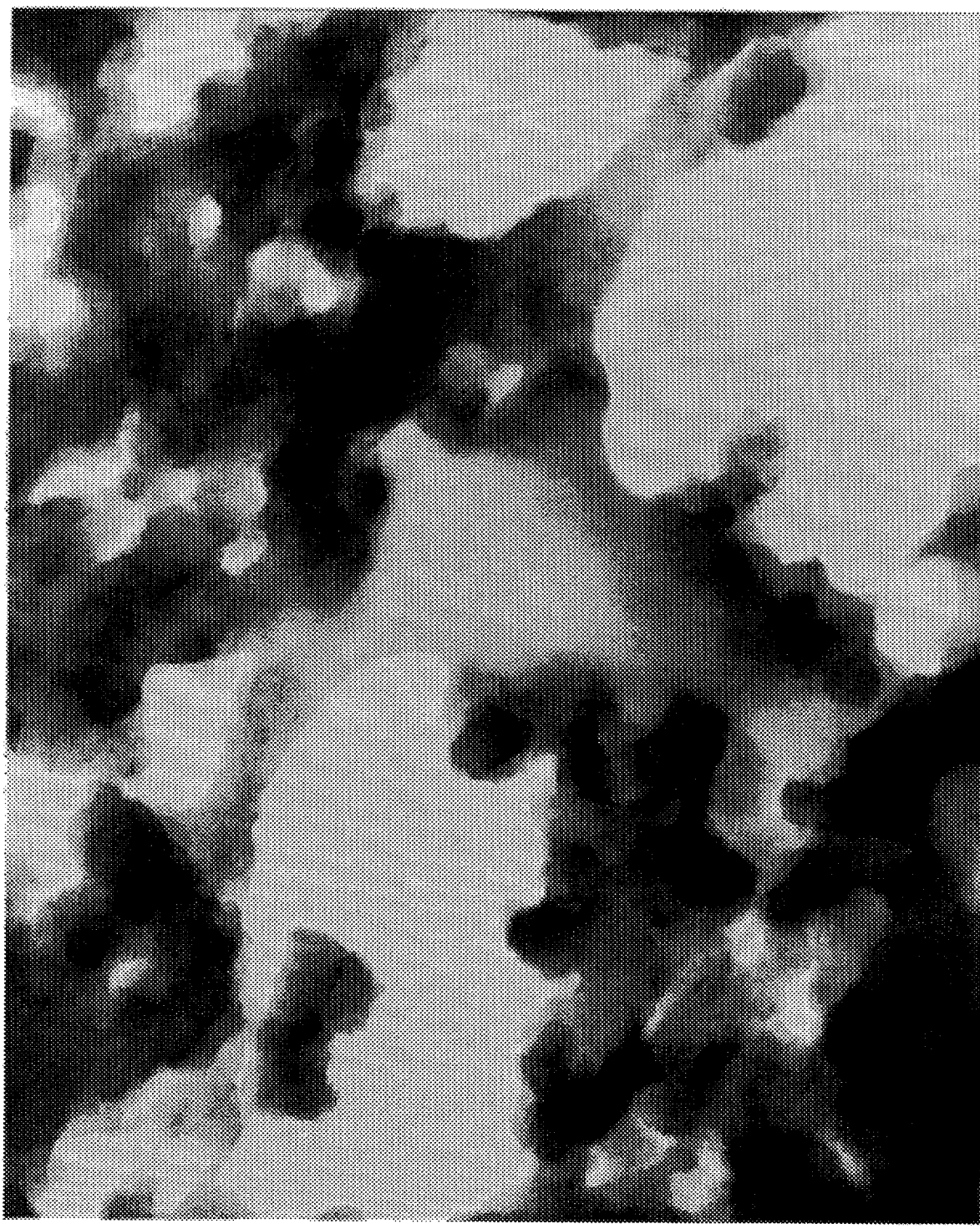

FIGS. 2 and 3 illustrate the transmission electron micrograph of the polymeric adsorbents prepared by these examples.

EXAMPLE 4a

Eight grams of an epoxy resin DER® 732, commercially available from The Dow Chemical Company, were added to a beaker containing 300 mL of a 25 percent propanol-water solution. While stirring vigorously 100 g of wet aminated post-crosslinked polymer of Example 2 was added to the beaker. Stirring was continued for six hours. The polymeric adsorbent was backwashed with a copious quantity of deionized water for 1 hour.

EXAMPLE 4b

The adsorbent was prepared as described in Example 4a. The adsorbent was transferred to a 3-necked round-bottom flask equipped with stirrer, reflux condenser and heating mantle. 0.9 mL of diethylene triamine was added to the adsorbent and deionized water slurry. The mixture was heated to 60° C. for 6 hours.

Figure 4:
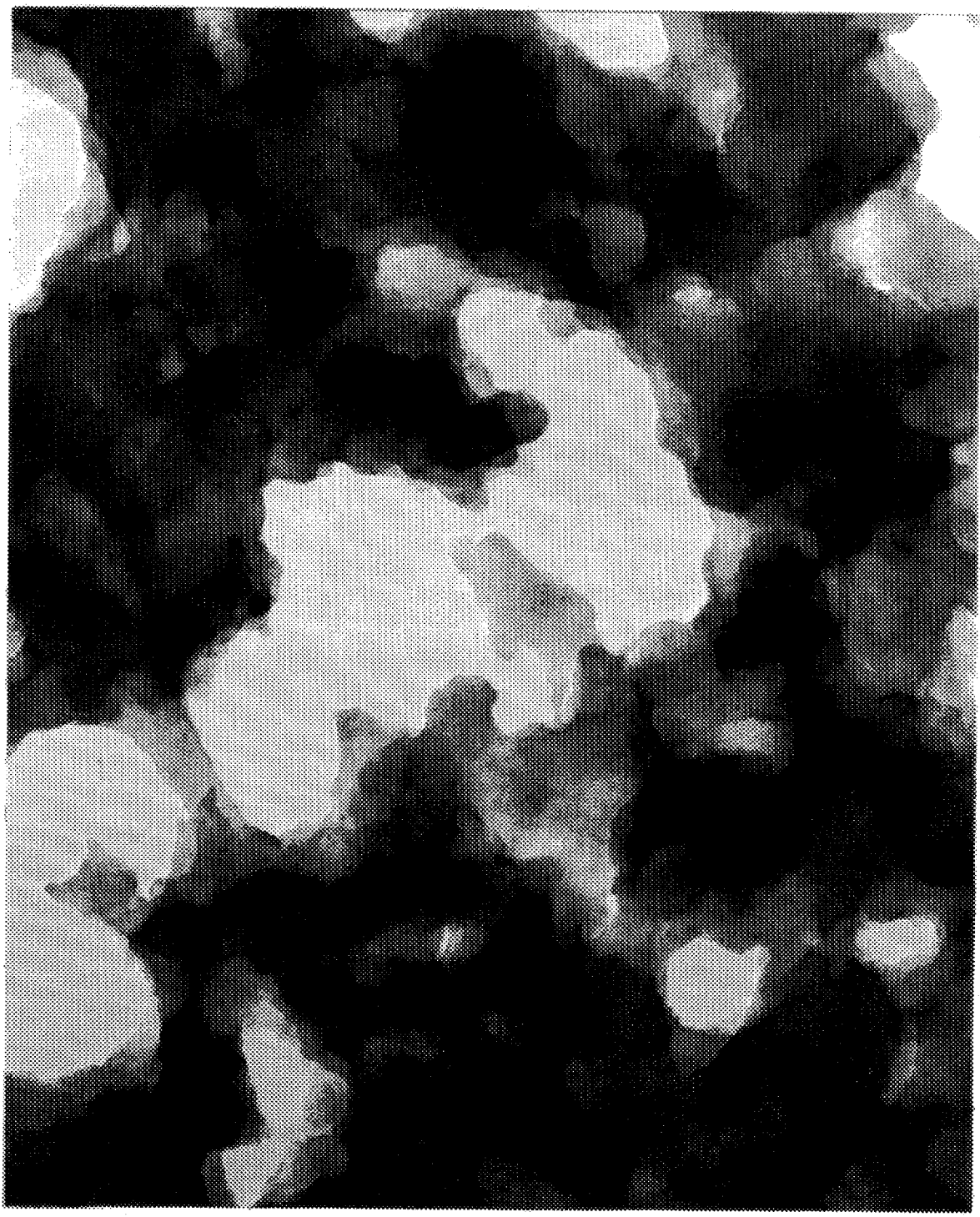

FIG. 4 illustrates the transmission electron micrograph of the adsorbent of this example.

EXAMPLE 5a

The adsorbent was prepared in essentially the same manner as described in Example 4a, only 10 g of an epoxy resin DER® 331, commercially available from The Dow Chemical Company, was substituted as the epoxy resin.

EXAMPLE 5b

The adsorbent was prepared from the adsorbent of Example 5a in the same manner as Example 4b was prepared from Example 4a above.

EXAMPLE 6

Figure 5:
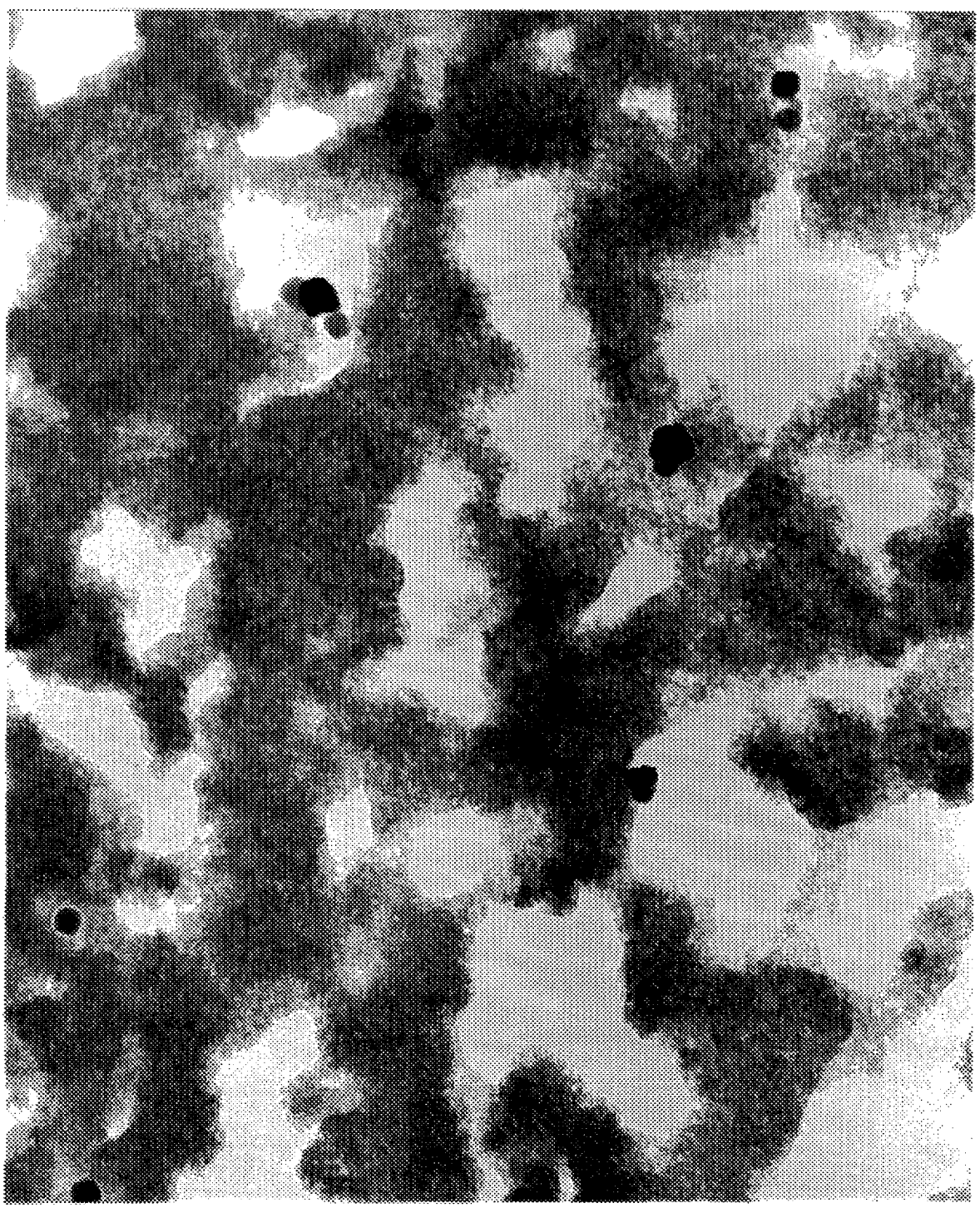

A porous post-crosslinked polymer of Example 2 prior to amination, containing residual chloromethyl groups was aminated in a 1-liter parr reactor using a large molar excess of methylamine. The excess amine was removed from the adsorbent by washing with dilute hydrochloric acid followed by dilute sodium hydroxide and deionized water. FIG. 5 illustrates the transmission electron micrograph of the aminated porous post-crosslinked polymer.

EXAMPLE 6a 2.73 Grams of epoxy silicone UV9320, available from General Electric, along with 300 mL of a 25 percent propanol-water solution was added to a 1 liter 3-necked round-bottom flask equipped with stirrer, reflux condenser and heating mantle. While stirring vigorously, 65 g of the wet polymer from Example 6 was added to the flask. Stirring was continued for six hours. The resin was backwashed with a copious quantity of deionized water for 1 hour.

Figure 6:

FIGS. 6 illustrates the transmission electron micrographs of Example 6a.

EXAMPLE 7

Preparation of the Substrate Polymer

A porous post-crosslinked polymer substrate was prepared by the method described in Example 1 of pending U.S. patent application Ser. No. 262,820, filed Jun. 21, 1994. The method is as follows:

A monomer mixture consisting of styrene (201.5 g), divinylbenzene (DVB, 241.8 g, 55 weight percent active, 30 weight percent based on monomer charge), toluene (856 g, 65.9 weight percent based on total organic load), t-butylperoctoate (5.32 g, 50 weight percent active) and t-butylperbenzoate (1.51 g) was added to an aqueous solution (1300 g), containing 0.2 weight percent carboxymethyl methyl cellulose and an aqueous phase polymerization inhibitor in an automated 3.785 liters (L) stainless steel reactor. The reactor was sealed, purged with nitrogen and the agitation started to size the monomer. After 45 minutes of sizing, the temperature was raised to 80° C. for 7 hours and then raised to 110° C. for 5 hours. After cooling to room temperature, the reactor mass was dumped and washed thoroughly to remove the suspending agents. The wet polymer beads were steam stripped to remove the toluene and then air dried overnight.

The dried polymer (50 g) was transferred into a 1-L jacketed glass reactor equipped with a stirrer, temperature controller and a condenser. Monochloromethyl methyl ether (500 mL)) was added and the agitation started. After about 30 minutes of swelling at room temperature, anhydrous ferric chloride (15 g) was added and reaction temperature slowly ramped to 52° C. and held constant for 3 hours. The chloromethylated beads (CMPS) after separation from the liquor, were washed 3 times with methanol to destroy the unreacted ether and to remove the entrained catalyst.

The methanol wet CMPS from above were washed 3 times with ethylene dichloride to remove most of the methanol and then transferred into a 1-L jacketed glass reactor equipped with a stirrer, temperature controller and distillation column. The reactor was then heated to 83° C. to distill any remaining methanol. After cooling, a reflux condenser was added to the reactor and ferric chloride (15 g) was added. The reactor temperature was slowly ramped to 80° C. and held constant for 3 hours. The methylene-bridged CMPS after separation from the liquor, were washed 3 times with methanol to remove the catalyst and ethylene dichloride followed by deionized water until free of acid.

EXAMPLES 8–18

Examples 8–18 illustrate the preparation of the optically active polymer immobilized in the porous post-crosslinked macroporous polymer substrate to obtain optically active polymeric adsorbents of the invention, and the applications thereof in the enantioselective synthesis and resolution of racemic mixtures.

EXAMPLE 8

Nonpolar Optically Active Polymer Immobilized on Post-crosslinked Macroporous Copolymer This example illustrates preparation of a subsequent surface modification of an initially surface-modified adsorbent polymer of the invention, carried out in two stages.

A 100-mL three-necked round-bottom flask was equipped with a nitrogen inlet, a reflux condenser connected to an oil bubbler with a nitrogen outlet, and a mechanical air-driven stirrer. The flask was immersed into an oil bath and a nitrogen atmosphere was established. 10 Grams of wet porous post-crosslinked polymer of Example 2 prior to amination, 20 mL water, and 0.8 g of tetrahydrofuran were placed into the flask, followed by 0.18 g methyl methacrylate, 0.18 g allyl methacrylate, and 3.6 mg 2,2'-azo-bis(isobutyronitrile), available under the Tradename VAZO-64 from dupont. The mixture was heated at 85° C. for 3 hours with slow mechanical stirring. The surface-modified adsorbent thus obtained was subsequently surface-modified with an optically active polymer as described below.

A mixture of (L)-menthyl methacrylate (1.5 g) and methyl methacrylate (1.0 g) was added by a syringe pump at 85° C.

for 12 hours, constantly maintaining the nitrogen atmosphere to the surface-modified polymer obtained above. The resulting mixture was then cooled, the liquid phase removed, and the resulting subsequent surface-modified polymeric adsorbent was washed several times with chloroform. Analysis of the liquid phase and washings on the percentage of solids indicated that the percentage of the optically active polymer immobilized on the macroporous polymer is about 95 percent.

EXAMPLES 9–13

The initial surface-modified polymers obtained in Example 8 were used to immobilize subsequent nonionic optically-active polymers thereon by the method described in Example 8. The substrate polymer used in Examples 9–12 for initial surface modification is that of Example 2 prior to amination. The substrate polymer used in Example 13 for initial surface modification is that of Example 7.

Table I sets forth the respective compositions of monomers used in the subsequent surface modification.

TABLE I

Nonionic Optically-Active Polymers Immobilized on Initial Surface-Modified Polymers of Example 8

| Example | Subsequent Surface-Modifying Monomers (Weight Percent) | | |
|---|---|---|---|
| | (L)-MnMA | (L)-PMA | MMA |
| 9 | 70 | — | 30 |
| 10 | — | 80 | 20 |
| 11 | — | 50 | 50 |
| 12 | 30 | — | 70 |
| 13 | 60 | — | 40 |

(L)-PMA = (L)-1-phenylethyl methacrylamide
(L)-MnMA = (L)-menthyl methacrylate
MMA = methyl methacrylate

EXAMPLE 14

Anionic Optically-active Polymer Immobilized on Post-crosslinked Macroporous Copolymer A 100-mL three-necked round-bottom flask was equipped with a nitrogen inlet, a reflux condenser connected to an oil bubbler with a nitrogen outlet, and a mechanical stirrer. The flask was immersed into an oil bath and a nitrogen atmosphere was established. The porous post-crosslinked polymer of Example 2 prior to amination (10 g of wet resin), water (20 mL), and tetrahydrofuran (0.8 g) were placed into the flask, followed by the methyl methacrylate (0.18 g), allyl methacrylate (0.18 g), and VAZO™ 64 (3.6 mg). This mixture was heated at 85° C. for 3 hours with slow mechanical stirring. After this, the mixture of (L)-menthyl methacrylate (1.0 g), methyl methacrylate (0.75 g), and methacrylic acid (0.75 g) was added by a syringe pump at 85° C. for 12 hours, constantly maintaining the nitrogen atmosphere. The resulting mixture was cooled, the liquid phase was removed, and the resulting polymeric adsorbent was washed several times with chloroform or tetrahydrofuran. Analysis of the liquid phase and washings on the percentage of solids indicated that the percentage of the optically polymer immobilized on the post-crosslinked polymer is about 95 percent.

EXAMPLE 15

(L)-Menthyl Methacrylate Containing Cationic Optically Active Polymer Immobilized on Post-crosslinked Macroporous Copolymer A 250-mL three-necked round-bottom flask was equipped with a nitrogen inlet, a reflux condenser connected to an oil bubbler with a nitrogen outlet, and a mechanical air-driven stirrer. The flask was immersed into an oil bath and a nitrogen atmosphere was established. A porous post-crosslinked polymer of Example 2 prior to amination, (30 g of wet resin), water (60 mL), and tetrahydrofuran (2.4 g) were placed into the flask, followed by the methyl methacrylate (0.54 g), allyl methacrylate (0.54 g), and VAZO™ 64 (10.8 mg). This mixture was heated at 85° C. for 3 hours with slow mechanical stirring. After this, the mixture of (L)-menthyl methacrylate (3.0 g), methyl methacrylate (2.25 g), and vinyl benzylchloride (2.25 g) was added by a syringe pump at 85° C. for 12 hours, constantly maintaining the nitrogen atmosphere. The resulting mixture was cooled, the liquid phase was removed, and the resulting polymeric adsorbent was washed several times with chloroform or tetrahydrofuran. Analysis of the liquid phase and washings on the percentage of solids indicated that the percentage of the optically active polymer immobilized on the post-crosslinked polymer is about 90 percent.

The adsorbent polymer obtained was placed into a 250 mL three-necked round-bottom flask equipped with a reflux condenser and a mechanical air-driven stirrer. Tetrahydrofuran (55 mL) was added to this solution, followed by methyl sulfide (1.5 mL). The resulting mixture was stirred at 35° C. for 16 hours and at 45° C. for additional one hour. After this, water (50 mL) was added and unreacted methyl sulfide and tetrahydrofuran were removed by rotary-evaporation.

EXAMPLE 16

(L)-1-Phenylethyl Methacrylamide Containing Cationic Optically Active Polymer Immobilized on Post-crosslinked Macroporous Copolymer The procedure of Example 15 was repeated except a solution of (L)-1-phenylethylmethacrylamide (3.0 g), methyl methacrylate (2.25 g), and vinylbenzylchloride (2.25 g) in tetrahydrofuran (2 mL) was used to prepare the optically active polymer of the invention. Analysis of the liquid phase and washings on the percentage of solids indicated that the percentage of the optically active polymer immobilized on the post-crosslinked polymer substrate is about 90 percent. The adsorbent was treated in the same manner as in Example 15.

EXAMPLE 17

This example illustrates enantioselective reduction of a ketone.

A solution of phenyl-[1-(2-phenylethyl)-4-piperidyl]-ketone (0.10 g) in tetrahydrofuran (0.40 g) was added to wet surface-modified adsorbent of Example 10 (1.0 g) in excess aqueous NaOH pH 9.0 (2.0 mL). This mixture was stirred at ambient temperature for 30 minutes. After this, NaBH$_4$ (20 mg) was added and the resulting mixture was stirred at ambient temperature for 16 hours. The liquid phase was then decanted and the adsorbent was washed with tetrahydrofuran in order to quantitatively extract all product from the resin. The tetrahydrofuran washings were combined with liquid phase and analyzed by chiral High Pressure Liquid Chromatography (HPLC) using a Chiracel OD-R column commercially available from Chiral Technologist Incorporation and 1.0 M aqueous NaClO$_4$/acetonitrile (60/40 by volume) as a mobile phase. The product α-phenyl-[1-(2-phenylethyl)]-4-piperidinemethanol of a moderate enantiomeric purity (enantiomeric excess of S (−)=25 percent) was obtained.

EXAMPLE 18

This example illustrates resolution of racemic alcohols.

A solution of racemic (±)-α-phenyl-[1-(2-phenylethyl)]-4-piperidinemethanol (0.30 g) in tetrahydrofuran/aqueous NaOH pH 11.0 (50/50 by weight; 12 mL) was added to (0.5 g) wet surface-modified adsorbent of Example 11. The resulting mixture was stirred at ambient temperature for 30 minutes. The liquid phase was then decanted and analyzed by chiral HPLC under conditions described in Example 15. HPLC showed that the liquid phase contained 45.6 percent (137 mg) of the starting alcohol, and it had moderate enatiomeric purity (entantiomeric excess of S(−)=18 percent). In a test experiment, the racemic (±)-α-phenyl-[1-(2-phenylethyl)]-4-piperidinemethanol was analyzed by chiral HPLC under identical conditions, and no enantioselectivity was observed (peaks corresponding to single alcohol enantiomers showed the same area of 50.0+0.1 percent).

The water retention capacities, water volumes, and the pore volume distribution, as determined by BET nitrogen adsorption, of the adsorbents and those of the porous post-crosslinked polymer substrates were measured and are listed in Table II. The different values for water retention capacities of the substrate polymer of Example 2, namely 1.3 and 1.43, are due to lot to lot variation in the preparation of the polymer. Porosity of the surface-modified adsorbent of the above examples is compared with its respective porous post-crosslinked polymer substrate and percent porosity reduction calculated. The percent porosity reduction is the loss in pore volume due to the filling of the pores of the porous post-crosslinked polymer by the surface-modifying polymer.

TABLE II

Water Retention Capacities and Pore volume Distribution or Surface-Modified Post-crosslinked Adsorbents

| Example | Surface-Modifying Polymer Expressed as g/g* of Dry Substrate Polymer | Water Retention Capacity (Wt. %) | CC Water per Gram Adsorbent | PORE SIZE RANGE (Å) <8 Å (cc/g) | <20 Å (cc/g) | 20–100A (cc/g) | >100 (cc/g) | Total (cc/g) |
|---|---|---|---|---|---|---|---|---|
| 1 | substrate polymer | 55.0 | 1.22 | 0.05 | 0.48 | 0.24 | 0.01 | 0.73 |
| 1a | 0.022* EGDM | 56.9 | 1.32 | 0.02 | 0.47 | 0.21 | 0.01 | 0.68 |
|  | percent reduction |  | +8.18 | (50) | (2.7) | (13.9) | (11.1) | (6.43) |
| 1b | 0.044* EGDM | 55.7 | 1.26 | 0.03 | 0.48 | 0.18 | 0.01 | 0.67 |
|  | percent reduction |  | +3.03 | (26.1) | (0.6) | (23.5) | (22.2) | (8.35) |
| 1c | 0.089* EGDM | 62.2 | 1.65 | 0.02 | 0.50 | 0.22 | 0.01 | 0.73 |
|  | percent reduction |  | −34.8 | (47.8) | +2.3 | (6.7) | 0 | (0.68) |
| 1d | 0.178* EGDM | 60.6 | 1.54 | 0 | 0.48 | 0.19 | 0.01 | 0.68 |
|  | percent reduction |  | +25.9 | (100) | (1) | (18.5) | (11.1) | (6.84) |
| 1e | 0.356* EGDM | 43.0 | 0.75 | 0 | 0 | 0 | 0.00 | 0.00 |
|  | percent reduction |  | (38.3) | (100) | (100) | (100) | (88.9) | (99.86) |
| 2 | subsrate polymer aminated with dimethylamine | 56.6 | 1.30 | 0.16 | 0.41 | 0.11 | 0.53 | 1.04 |
| 2a | 0.075* Polyamide |  |  | 0.15 | 0.33 | 0.08 | 0.51 | 0.92 |
|  | percent reduction |  |  | (10.4) | (19) | (25) | (3.6) | (11.9) |
| 2 | substrate polymer aminated with dimethylamine | 56.6 | 1.30 | 0.16 | 0.41 | 0.11 | 0.53 | 1.04 |
| 3a | 0.075* Nylon 6 | 54.1 | 1.18 | 0.13 | 0.32 | 0.08 | 0.47 | 0.87 |
|  | percent reduction |  | (9.59) | (23.8) | (22.2) | (25.9) | (9.9) | (16.41) |
| 3b | 0.198* Nylon 6 | 49.1 | 0.97 | 0.07 | 0.19 | 0.05 | 0.40 | 0.63 |
|  | percent reduction |  | (26.0) | (57.3) | (53.3) | (57.1) | (24.8) | 39.35 |
| 2 | substrate polymer aminated with dimethylamine | 58.9 | 1.43 | 0.17 | 0.42 | 0.13 | 0.55 | 1.11 |
| 4a | 0.243* DER ® 732 Epoxy | 48.8 | 0.95 | 0.03 | 0.15 | 0.08 | 0.48 | 0.72 |
|  | percent reduction |  | (33.5) | (83.1) | (63.2) | (41.4) | (11.2) | (34.57) |
| 4b | 0.243* DER ® 732/DETA** | 48.7 | 0.95 | 0.02 | 0.11 | 0.05 | 0.38 | 0.54 |
|  | percent reduction |  | (33.8) | (88.6) | (74.9) | (61.7) | (30.9) | (51.31) |

DETA** Diethylenetriamine

| Example | Surface-Modifying Polymer | Water Retention Capacity (Wt. %) | CC Water per Gram Adsorbent | <8 Å (cc/g) | <20 Å (cc/g) | 20–100A (cc/g) | >100 (cc/g) | Total (cc/g) |
|---|---|---|---|---|---|---|---|---|
| 2 | substrate polymer aminated with dimethylamine | 58.9 | 1.43 | 0.17 | 0.42 | 0.13 | 0.55 | 1.11 |
| 5a | 0.243* DER ® 331 | 50.8 | 1.03 | 0.09 | 0.22 | 0.09 | 0.58 | 0.88 |
|  | percent reduction |  | (27.9) | (47) | (46.5) | (35.3) | +4.5 | (19.64) |
| 5b | 0.243 DER ® 331/DETA | 47.8 | 0.92 | 0.76 | 0.21 | 0.07 | 0.47 | 0.75 |
|  | percent reduction |  | (36.1) | (54.2) | (50.6) | (51.1) | (14.5) | (32.58) |
| 2 | substrate polymer aminated with methyl | 55.9 | 1.27 | 0.18 | 0.46 | 0.10 | 0.42 | 0.98 |

TABLE II-continued

Water Retention Capacities and Pore volume Distribution or Surface-Modified Post-crosslinked Adsorbents

| Example | Surface-Modifying Polymer Expressed as g/g* of Dry Substrate Polymer | Water Retention Capacity (Wt. %) | CC Water per Gram Adsorbent | <8 Å (cc/g) | <20 Å (cc/g) | 20–100Å (cc/g) | >100 (cc/g) | Total (cc/g) |
|---|---|---|---|---|---|---|---|---|
| 6a | amine 0.095* G.E. Silicone percent reduction | 52.1 | 1.09 (14.2) | 0.14 (25.3) | 0.37 (20.1) | 0.10 +1 | 0.42 (0.2) | 0.88 (9.53) |
| 2 | substrate polymer prior to amination | 57.9 | 1.375 | 0.206 | 0.506 | 0.171 | 0.668 | 1.35 |
| 13 | 0.593 AMA/L-MnMA/MMA percent reduction | 54.5 | 1.197 (12.9) | 0.148 (28.2) | 0.453 (10.5) | 0.164 (4.1) | 0.576 (13.8) | 1.193 (11.3) |
| 14 | 0.593 AMA/L--MnMA/MMA/MAA percent reduction | 51.2 | 1.05 (23.7) | 0.03 (87.9) | 0.19 (62.5) | 0.09 (46.8) | 0.538 (19.5) | 0.819 (39.1) |

The actual water volume and total pore volume of some of the adsorbents in Table II are compared to the respective theoretical water volume and total pore volume based on simple pore filling of the porous post-crosslinked substrate polymer by the surface-modifying monomer or polymer and are set forth in Table III. The theoretical water volume and pore volume are calculated as shown in equations 1 and 2, respectively. The substrate water and substrate pore volume are expressed as cc per gram of the substrate polymer (cc/g). The surface-modifying polymer is expressed as grams per grams of substrate polymer (g/g). The density of the surface-modifying polymer is that after incorporation into the substrate polymer and is estimated using the density of similar polymers prepared by conventional methods.

$$\text{Theoretical water volume} = \frac{\text{substrate water} - [\text{surface modifying polymer/density}]}{1 + \text{surface-modifying polymer}} \quad \text{(Equation 1)}$$

$$\text{Theoretical pore volume} = \frac{\text{substrate pore volume} - (\text{surface-modifying polymer/density})}{1 + \text{surface-modifying polymer}} \quad \text{(Equation 2)}$$

Transmission Electron Micrographs (300,000X) of the adsorbents illustrated in FIGS. 1–6 are obtained from 300 Angstrom thick cross-section of the adsorbents of the invention and indicate that the surface-modifying polymers are distributed throughout the polymer substrate.

TABLE III

Comparison of Theoretical and Actual Water Volumes and Total Pore Volume

| Example | Surface-Modifying Polymer Expressed as g/g* of Dry Substrate Polymer | Surface--Modifying Density (g/cc) | Water Volume (cc/g) Actual | Water Volume (cc/g) Theoretical | Total Pore Volume (cc/g) Actual | Total Pore Volume (cc/g) Theoretical |
|---|---|---|---|---|---|---|
| 1 | substrate Polymer | — | 1.22 | — | 0.73 | — |
| 1a | 0.022* EGDM | 1.10 | 1.32 | 1.18 | 0.68 | 0.70 |
| 1b | 0.044* EGDM | 1.10 | 1.26 | 1.13 | 0.67 | 0.66 |
| 1c | 0.089* EGDM | 1.10 | 1.65 | 1.05 | 0.73 | 0.60 |
| 1d | 0.178* EGDM | 1.10 | 1.54 | 0.90 | 0.68 | 0.48 |
| 2 | substrate polymer aminated with dimethylamine | — | 1.30 | — | 1.04 | — |
| 2a | 0.075* polyamide | 1.10 | — | 1.15 | 0.92 | 0.90 |
| 3a | 0.75* Nylon | 1.14 | 1.18 | 1.15 | 0.87 | 0.91 |
| 2 | substrate polymer aminated with dimethylamine | — | 1.43 | — | 1.11 | — |
| 4a | 0.243* DER ™ 732 Epoxy | 1.06 | 0.95 | 0.97 | 0.72 | 0.70 |
| 4b | 0.243* DER ™ 732/DETA | 1.06 | 0.95 | 0.97 | 0.54 | 0.70 |
| 2 | substrate polymer aminated with dimethylamine | — | 1.43 | — | — | — |
| 5a | 0.243* DER ™ 331 | 1.16 | 1.03 | 0.98 | 0.89 | 0.72 |
| 5b | 0.243* DER ™ 331/DETA | 1.16 | 0.92 | 0.98 | 0.75 | 0.72 |
| 2 | substrate polymer aminated with methylamine | — | 1.27 | — | 0.98 | — |
| 6a | 0.095* GE Silcone | 1.00 | 1.09 | 1.07 | 0.88 | 0.80 |

The data illustrated in Tables II and III are evidence that polymeric adsorbent materials that are both incompatible and compatible for molecular level mixing with polystyrene can be produced using this technique. Furthermore, this approach can be applied to produce materials with shapes other than spherical beads, such as membranes or fibers by altering the form of the first polymer.

EXAMPLE 19

Nonionic Polymer Immobilized on Post-Crosslinked Macroporous Copolymer

This example illustrates preparation of a surface modification of an adsorbent polymer of the invention, carried out in two stages.

(a) A 1000-mL three-necked round-bottom flask was equipped with a nitrogen inlet, a reflux condenser connected to an oil bubbler with a nitrogen outlet, and a mechanical air-driven stirrer. The flask was immersed into an oil bath and a nitrogen atmosphere was established. Wet porous post-crosslinked polymer of Example 2 prior to amination (100 g), 200 mL water, and 8 g of tetrahydrofuran were placed into the flask, followed by 1.80 g methyl methacrylate, 1.80 g allyl methacrylate, and 36 mg 2,2'-azo-bis(isobutyronitrile), available under the Tradename VAZO-64® from dupont. The mixture was heated at 85° C. for 3 hours with slow mechanical stirring. The surface-modified adsorbent thus obtained was subsequently surface-modified with another polymer as described below.

(b) A mixture of methyl methacrylate (12.5 g), styrene (5.0 g), and vinylbenzylchloride (7.5 g; isomer ratio: 70% metal 30% para) was added to the mixture of (a) by a syringe pump at 85° C. over 12 hours, constantly maintaining the nitrogen atmosphere. The resulting mixture was then cooled, the liquid phase removed, and the resulting surface-modified polymeric adsorbent was washed several times with chloroform. Analysis of the liquid phase and washings on the percentage of solids indicated that the percentage of the surface-modifying polymer immobilized on the macroporous polymer is over 97 percent.

EXAMPLE 20

Cationic Polymer Immobilized on Post-Crosslinked Macroporous Copolymer

The nonionic surface-modified post-crosslinked adsorbent of Example 19 (36.8 g of dry polymer) was placed into a 500-mL three-necked round-bottom flask equipped with a reflux condenser and a mechanical air-driven stirrer. Tetrahydrofuran (100 mL) was added to this solution, followed by methyl sulfide (3.0 mL). The resulting mixture was stirred at 35° C. for 16 hours and at 45° C. for an additional one hour. After this, water (100 mL) was added, and unreacted methyl sulfide and tetrahydrofuran were removed by rotary-evaporation.

EXAMPLE 21

Anionic Polymer Immobilized on Post-Crosslinked Macroporous Copolymer

A 1000-mL three-necked round-bottom flask was equipped with a nitrogen inlet, a reflux condenser connected to an oil bubbler with a nitrogen outlet, and a mechanical stirrer. The flask was immersed into an oil bath and a nitrogen atmosphere was established. The porous post-crosslinked polymer of Example 2 prior to amination (100 g of wet resin), water (200 mL), and tetrahydrofuran (8 g) were placed into the flask, followed by the methyl methacrylate (1.80 g), allyl methacrylate (1.80 g), and VAZO-64™ (36 mg). This mixture was heated at 85° C. for 3 hours with slow mechanical stirring. After this, the mixture of methyl methacrylate (10.0 g), butyl acrylate (7.5 g), and methacrylic acid (7.5 g) was added by a syringe pump at 85° C over 12 hours, constantly maintaining the nitrogen atmosphere. The resulting mixture was cooled, the liquid phase was removed, and the resulting polymeric adsorbent was washed several times with tetrahydrofuran. Analysis of the liquid phase and washings on the percentage of solids indicated that the percentage of the surface-modifying polymer immobilized on the post-crosslinked macroporous copolymer is about 97 percent.

EXAMPLE 22

This example illustrates separation of compounds by column chromatography on nonionic surface-modified post-crosslinked adsorbent of Example 19.

A mixture of phenylcyclohexane (30 mg) and ethyl 3-hydroxybenzoate (13 mg) was introduced onto a chromatographic column (25.4 cm×1.27 cm) packed with 5.0g of the dry nonionic, surface-modified, post-crosslinked adsorbent of Example 19 as the stationary phase. The mixture was eluted with 30 ml of cyclohexane/chloroform (5:1 volume ratio) followed by 100 ml of cyclohexane/chloroform (1:1 volume ratio). The eluate from 5:1 cyclohexane/chloroform contained 98.7 percent phenylcyclohexane and 1.3 percent ethyl 3-hydroxybenzoate. The eluate from 1:1 cyclohexane/chloroform contained >99.9 percent ethyl 3-hydroxybenzoate.

EXAMPLE 23

This example illustrates separation of compounds by column chromatography on cationic surface-modified post-crosslinked adsorbent of Example 20.

A mixture of phenylcyclohexane (30 mg) and 3-phenylbutyric acid (13 mg) was introduced onto a chromatographic column (25.4 cm×1.27 cm) packed with 5.0 g of the dry nonionic, surface-modified, post-crosslinked adsorbent of Example 20 as the stationary phase. The mixture was eluted with 100 ml of cyclohexane followed by 200 ml of cyclohexane/chloroform (1:1 volume ratio). The eluate from the cyclohexane contained >99.9 percent phenylcyclohexane. The eluate from 1:1 cyclohexane/chloroform contained >99.9 percent 3-phenylbutyric acid.

EXAMPLE 24

This example illustrates separation of compounds by column chromatography on anionic surface-modified post-crosslinked adsorbent of Example 21.

A mixture of phenylcyclohexane (27 mg) and 2-phenylbutyric acid (27 mg) was introduced onto a chromatographic column (25.4 cm×1.27 cm) packed with 5.0 g of the dry nonionic, surface-modified, post-crosslinked adsorbent of Example 21 as the stationary phase. The mixture was eluted with 50 ml of cyclohexane followed by 150 ml of cyclohexane/chloroform (1:1 volume ratio). The eluate from the cyclohexane contained >99.9 percent phenylcyclohexane. The eluate from 1:1 cyclohexane/chloroform contained >99.9 percent 2-phenylbutyric acid.

What is claimed is:

1. A polymeric adsorbent material comprising (a) a substrate of a porous post-crosslinked polymer of at least one monoethylenically unsaturated monomer and a crosslinking agent, wherein at least one monethylenically unsaturated monomer is styrene and the crosslinking agent is divinylbenzene, said polymer being post-crosslinked by the steps of (i) reacting the polymer with a polyfunctional haloalkylating or acylating agent to form a haloalkylated or acylated polymer, (ii) swelling the resulting haloalkylated or acylated polymer with an inert swelling agent to form a swollen, haloalkylated or acylated polymer, and then (iii) maintaining the swollen, haloalkylated or acylated polymer at a temperature and in the presence of a Friedel-Crafts catalyst such that haloalkyl or acyl moieties on the polymer react with an aromatic ring of an adjacent polymer chain to form a bridging moiety, and (b) at least one non-optically active, surface-modifying polymer of an ethylenically unsaturated monomer, said surface-modifying polymer being incorporated and immobilized onto the substrate.

2. The polymeric adsorbent material of claim 1, wherein the porous post-crosslinked polymer comprises a macroporous polymer comprising from about 1 to about 35 weight percent of divinylbenzene.

3. The polymeric adsorbent material of claim 1, wherein the porous post-crosslinked polymer comprises a gel polymer comprising from about 0.0 to about 8.0 weight percent of divinylbenzene.

4. The polymeric adsorbent of claim 2, wherein the macroporous polymer comprises from about 1 to about 10 percent by weight of divinylbenzene.

5. The polymeric adsorbent of claim 1, wherein the surface-modifying polymer is derived from a monomer or a polymer which is an acrylate, methacrylate, styrene, functionalized styrene or a combination thereof.

* * * * *